United States Patent [19]
Kusafuka et al.

[11] Patent Number: 5,205,504
[45] Date of Patent: Apr. 27, 1993

[54] AUTO-THREADING APPARATUS

[75] Inventors: Noboru Kusafuka; Akira Yoshida; Susumu Tsuyuki; Tatsushi Seko; Yoshimitsu Tsutsui; Toshio Miki; Ryoji Mouri, all of Nagoya, Japan

[73] Assignee: Mitsubishi Jukogyo Kabushiki Kaisha, Tokyo, Japan

[21] Appl. No.: 930,561

[22] Filed: Aug. 17, 1992

Related U.S. Application Data

[63] Continuation of Ser. No. 612,147, Nov. 13, 1990.

[30] Foreign Application Priority Data

Nov. 10, 1989 [JP] Japan .................. 1-293118
Sep. 21, 1990 [JP] Japan .................. 2-252242

[51] Int. Cl.⁵ .................. B65H 35/02; G03B 1/56
[52] U.S. Cl. .................. 242/56.2; 226/92
[58] Field of Search .............. 242/56.2, 56.4, 56.5, 242/56.6, 56.7, 75.3, 76; 226/91, 92

[56] References Cited

U.S. PATENT DOCUMENTS

| | | | |
|---|---|---|---|
| 2,721,612 | 10/1955 | Almgren. | |
| 2,827,961 | 3/1958 | Pugh | 242/56.5 |
| 3,478,654 | 11/1969 | Willard. | |
| 3,743,197 | 7/1973 | Hawkins | 242/56.5 |
| 3,805,652 | 4/1974 | LaLonde et al. | 242/56 R |
| 3,871,290 | 3/1975 | Verboom | 242/56.2 X |
| 4,210,987 | 7/1980 | Benson et al. | 226/91 X |
| 4,611,518 | 9/1986 | Hildebrandt | 242/565 X |
| 4,747,254 | 5/1988 | Lancaster. | |
| 4,964,585 | 10/1990 | Negrussi | 242/56 R |

FOREIGN PATENT DOCUMENTS

| | | | |
|---|---|---|---|
| 220037 | 12/1983 | Japan | 242/56 R |
| 8153 | 1/1988 | Japan | 242/56 R |
| 33041 | 2/1990 | Japan | 242/56 R |
| 649568 | 2/1979 | U.S.S.R. | 242/56 B |
| 1138375 | 2/1985 | U.S.S.R. | 242/56 R |

Primary Examiner—Daniel P. Stodola
Assistant Examiner—Michael R. Mansen
Attorney, Agent, or Firm—Wenderoth, Lind & Ponack

[57] ABSTRACT

An auto-threading apparatus is disclosed. In a film processing line incorporating a transferring/receiving mechanism having a take-up unit, two pairs of cutters are moved by twos in crosswise directions of a film to cut away side narrow portions of the film by one pair of cutters. Chain clips catch the film ends to longitudinally divide the film into three parts by the other pair of cutters. The side portions of the 3-divided film are cut away by rotary cutters. The left central portion thereof is cut away by moving the other pair of cutters toward the center. The film is transferred to and received by the chain clips.

16 Claims, 8 Drawing Sheets

FIG. 10
(PRIOR ART)
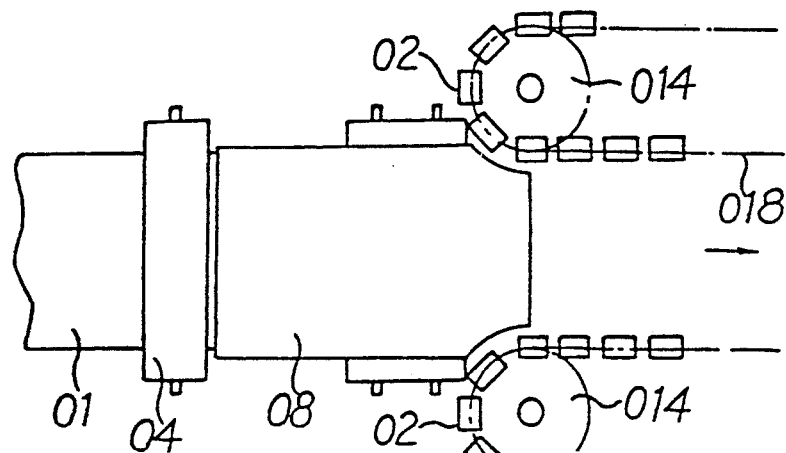
FIG. 11
(PRIOR ART)
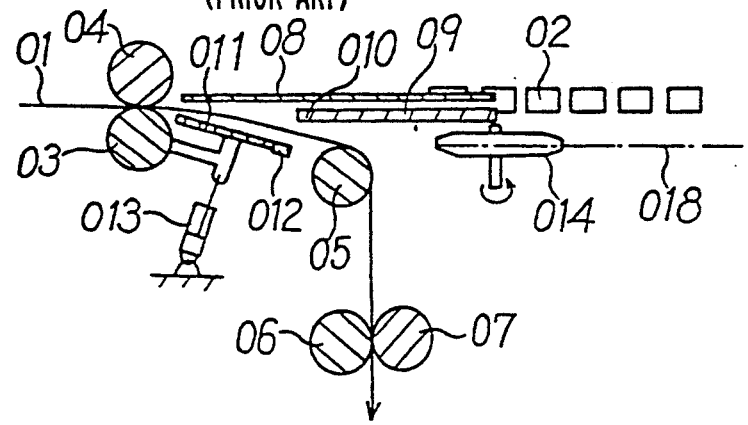
FIG. 12
(PRIOR ART)

AUTO-THREADING APPARATUS

This is a continuation application of Ser. No. 07/612,147, filed Nov. 13, 1990.

BACKGROUND OF THE INVENTION

1. Field of the Invention

This invention relates to an auto-threading method and apparatus suited to receive film and transfer the film to a tentering machine (crosswise stretching machine) in a biaxial stretching line.

2. Description of the Prior Art

In general, the threading of band-like material such as film has hitherto been effected manually. This manual threading has to be done during a film-manufacturing operation, which leads to a highly dangerous situation. A velocity at which the film is manufactured has to be decreased to secure safety during the threading operation. This deteriorates the working efficiency. An additional drawback is that two or more workers are required. Immediately after the film is threaded, it cannot be connected but remains in a split state. In the meantime, a scrap process has to be performed at a stenter outlet. The split scrap films are non-uniformly discharged from the stenter outlet while being seized by the clips. Especially when manufacturing thick films, the films gather formlessly. It is required that the gathered films be released from the clips and then treated.

An apparatus disclosed to obviate the conventional defects described above is shown in FIGS. 10 to 12. Referring to these Figures, the numerals 03, 05 represent guide rolls; 04 a nip roll; 06, 07 draw-off rolls for drawing off the film; and 08, 09 guide plates, formed of a material exhibiting a small frictional coefficient, for guiding the film. An upper edge 010 of a cutter is attached to the front end of the guide plate 09 so that the upper part of the upper edge coincides with the upper face of the guide plate 09, or alternatively, the upper edge is separately fixed from the guide plate. Another guide plate 011 formed of the material exhibiting the small frictional coefficient is movable up and down with the aid of an air cylinder 013, wherein the rotational axis of the guide roll 03 serves as the center of movement for plate 011. A lower edge 012 of the cutter is adjustably secured to the top end of the other guide plate 011 so that the upper part of the lower edge coincides with the upper face of the other guide plate 011. A sprocket wheel 014 functions to drive a clip chain 018 and clips 02. A disk 015 pushes blades of the clips to bite the film. Reference numeral 016 denotes a shaft, and 017 a nut.

The film 01 is carried via the guide rolls 03, 05 to the draw-off rolls 06, 07 by some means, e.g., a carrier rope, wherein the film is drawn off. The air cylinder 013 is operated to move upwards toward the other guide plate 011. The film is cut off by the cutter fitted to the top end of the guide plate 011 in cooperation with the cutter of the guide plate 09. The film is held in such a position that the upper face of the other guide plate 011 coincides with the upper face of the guide plate 09, or the other guide plate 011 is positioned slightly higher than the plate 09.

Next, the film 01 fed by the guide roll 03 and the nip roll 04 passes between the guide plates 08, 09. The film 01 reaches the clips 02 and is caught by these clips, and then the normal operation begins. Thereafter, the air cylinder 013 reverts to its original position preparatory to film threading.

In the prior art apparatus depicted in FIGS. 10 to 12, the film 01 passes between the guide plates 08, 09 with the help of the guide roll 03 and the nip roll 04, and both side edges at the end of the film are caught by the clips 02. However, when the soft or incompletely smooth film passes between the guide plates 08, 09, the end thereof remains free. Hence, if the film is pushed from behind, the film is bent, or creases are formed. It is therefore difficult for the clips to properly uniformly catch the film.

SUMMARY OF THE INVENTION

It is a primary object of the present invention to provide an auto-threading method and apparatus capable of obviating the foregoing problems inherent in the prior art.

To this end, according to one aspect of the invention, there is provided an auto-threading method in a film processing line where a transferring/receiving mechanism is equipped with a temporary take-up unit, comprising the steps of: moving two pairs of cutters by twos to positions in the crosswise direction of the film, and moving the cutters perpendicularly to the surface of the film, thereby cutting the film into narrow portions at both sides thereof; obliquely cutting away the narrow portions with one pair of cutters; causing clips carried by chains to catch both sides of the film via the oblique film ends; dividing the films into three parts in a longitudinal direction with the other pair of cutters; cutting away both ends of side parts of the divided film by using rotary cutters; and cutting away the remaining central part of the film by shifting the other pair of cutters, which divided the film into three parts, toward the center of the film, thereby leaving a portion of the film transferred to and received by the chain clips.

In the auto-threading method, the winding of the film fed out from the previous process on the temporary take-up unit can be changed over to cause the film to approach the chain clips by swinging take-up rolls into contact with the film after the film has been wound on the temporary take-up unit.

An oblique cut angle of the film is set at 4°–15°.

According to another aspect of the invention, there is provided an auto-threading apparatus in a film processing line where a transferring/receiving mechanism is equipped with a temporary take-up unit, comprising: two pairs of cutters movable by twos in crosswise (transverse) directions of the film and in directions perpendicular to the film surface (vertically), the cutters including blades having cutting edges freely rotatable into alignment with a film cutting direction; chain clips for catching both sides of the film via the oblique film ends passing therethrough after being formed by one of the two pairs of cutters; rotary cutters for cutting away both ends of side parts of the film formed by the other pair of cutters; and a control unit for controlling respective operations of the cutters, the chain clips and the rotary cutters.

The auto-threading apparatus further includes take-up roll or rolls provided in a space between the temporary take-up unit and guide rolls on the downstream side of the other pair of cutters, the take-up rolls being swingable into contact with the film.

In the auto-threading apparatus, film guide plates are provided in a film transferring/receiving location for guiding the film to the chain clips for catching the sides of the film.

The control unit includes an arithmetic unit for determining a timing at which the chain clips are to be shifted toward the film on the basis of a feeding velocity of the film and film pass data.

The apparatus further includes winding rolls for feeding the film while tensioning the film, at the sides thereof, in directions orthogonal to the feeding direction of the film.

In accordance with the auto-threading method and apparatus of this invention, the film can be surely, safely and automatically transferred to and received by the chain clips without requiring manual operations. If the film fails to be transferred to and received by the clips, the transferring/receiving step can resume automatically without stopping the travel of the film.

In advance of the auto-threading operation by which the clips are able to catch the film, the film is consecutively threaded from a longitudinal stretching device to a scrap take-up unit through threading chains This arrangement facilitates the threading operation.

The oblique cut angle is set at 4°-15°, whereby the film can be caught by the clips more surely. As a result, threading can be smoothly performed.

The guide plates are provided, thereby facilitating a smooth threading of the obliquely cut sides of the film. The operation timing of the chain clips is determined based on the film feeding speed and the film pass data. This arrangement eliminates the necessity for intricate sensors. The take-up roll or rolls feed out the film while tensioning the film edges in directions orthogonal to the film feeding direction. In consequence, the film can be carried with no slack, thereby threading the film more surely.

BRIEF DESCRIPTION OF THE DRAWINGS

Other objects and advantages of the present invention will become apparent during the following discussion taken in conjunction with the accompanying drawings, in which:

FIG. 10 is a plan view illustrating a prior art auto-threading apparatus;

FIG. 11 is a sectional view thereof; and

FIG. 12 is a sectional view illustrating in detail a chain clip employed in the prior art auto-threading apparatus.

DETAILED DESCRIPTION OF THE PREFERRED EMBODIMENTS

The present invention will hereinafter be described by way of embodiments with reference to the accompanying drawings. FIGS. 1 through 9 show illustrative embodiments of this invention. The following is a description of an embodiment of a film transferring/receiving mechanism according to the present invention. The film is shifted from a longitudinal stretching device of a plastic film biaxial stretching line to a crosswise stretching device thereof.

Figure 1:
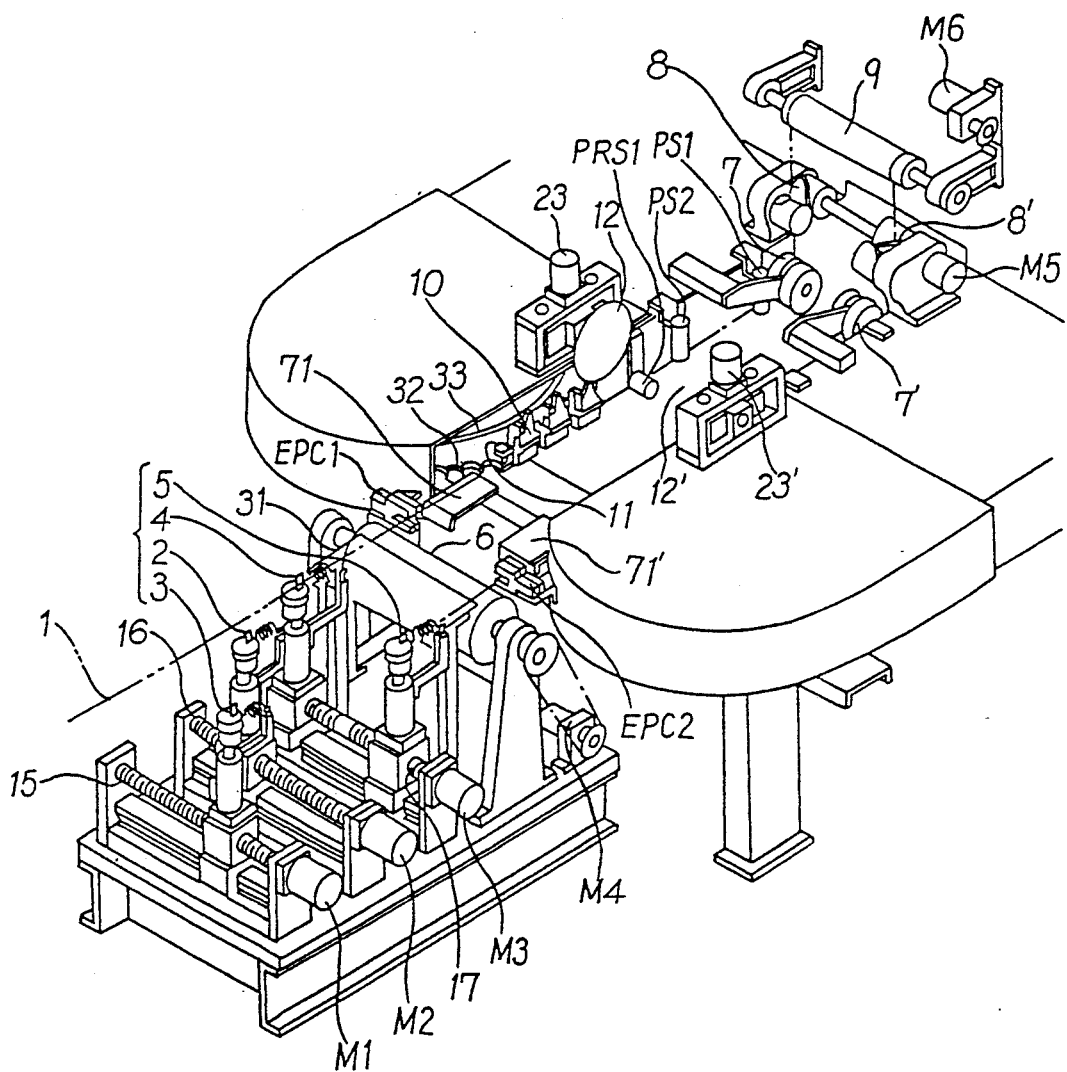
FIG. 1 is a perspective view of one embodiment of an auto-threading apparatus of this invention.
Figure 4:
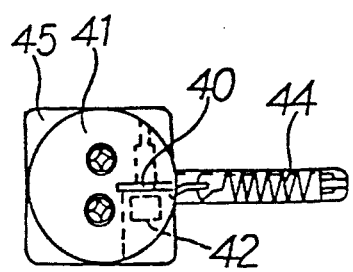
FIG. 4 is a plan view, in detail, of a cutter shown in FIG. 1.
Figure 5:
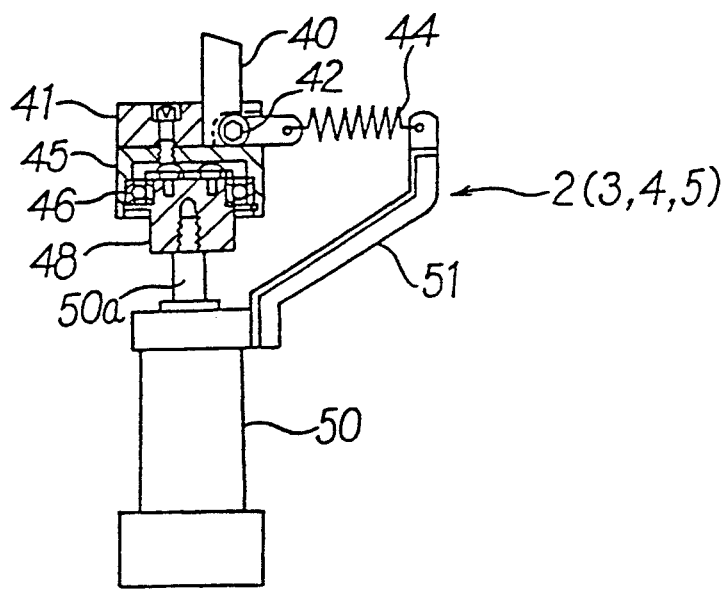
FIG. 5 is a side elevation view of the same cutter.

Referring first to FIG. 1, the direction of travel of a film 1 is indicated by a 2-dotted line. Longitudinal film cutters 2 to 5 are disposed at a location to which the film 1 is fed from the longitudinal stretching device. FIGS. 4 and 5 illustrate the structure of these cutters 2-5. Ball bearings 46 are incorporated in a shaft 48 attached to an operation rod 50a of a pneumatic cylinder 50. Fitted to an outer ring of the ball bearings 46 is a base 45 to which a cutter board 41 is mounted. A cutter blade 40 is mounted to the cutter board 41 with a screw 42. A weak spring 44 biases the cutter board 41 in a fixed direction.

Next, the cutters 2-5 will be described in greater detail. As illustrated in FIG. 1, these cutters 2 through 5 are movable at variable speeds in directions orthogonal to the feeding direction of the film 1 by means of motors M1, M2 and M3 each equipped with a speed reducer in combination with feed screws 15, 16 and 17. The feed screw 17 has threads chased reversely to each other from its center. When the motor M3 rotates, the cutters 4 and 5 approach a central line of the film or move away therefrom. When raising the cutters 4 and 5 during travel of the film 1, the film 1 is cut in the longitudinal direction. The film 1 may be cut obliquely by turning the screw 17 during such time. Note that the cutter blade 40 is rotatable into alignment with the cutting direction at that time; however, when the knife is moved out of the way of the film 1, it is realigned with the feeding direction of the film 1 by dint of a spring 44.

Next, the film 1 enters a clip unit of the crosswise stretching device via a bridge plate 31 and a feed roll 6. The feed roll 6 is driven by the motor M4 provided with a speed reducer. Narrow free ends of the film, which have been cut away by the cutters 4 and 5, are bent downwards by the feed roll 6 and become scraps.

Figure 2:
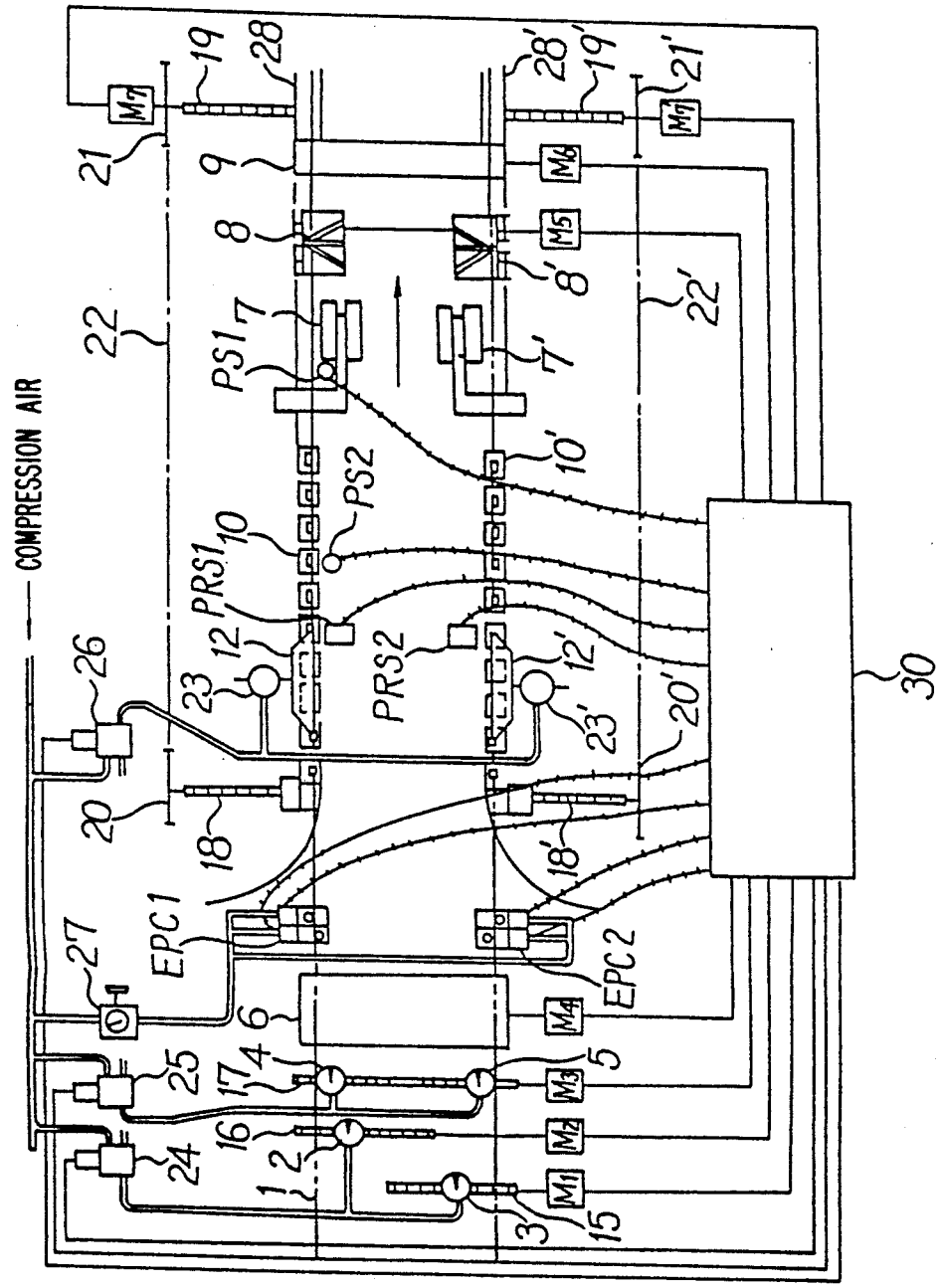
FIG. 2 is a schematic diagram of a control system in the apparatus of FIG. 1.

Provided at the inlet of the crosswise stretching device depicted in FIG. 1 are guide plates 71, 71' for guiding both sides of the film. With this arrangement, both sides of the film cut obliquely by the cutters 4 and 5 are assuredly seized by chain clips 10, 10' (FIG. 2). One end of each of the guide plates 71, 71' is bent downwards. The chain clips 10, 10' are attached to chain links 11 to constitute a chain.

Reference numeral 32 designates a chain sprocket supported on a board. This board and rails 28, 28' for guiding the chain clips 10, 10' are movable independently in right-and-left directions orthogonal to the feeding direction of the film by motors M7, M7' having speed reducers drivingly connected to feed screws 18, 18', 19, 19' through chains 22, 22' and sprockets 20, 20', 21, 21'. Film end detectors EPC1, EPC2, guide plates 71, 71', clip closers 12, 12' and clip confirming switches PRS1, PRS2 simultaneously shift because they are mounted on the same frame as that of sprockets 32, 32' and rails 28, 28'. Pneumatic cylinders 23, 23' move the closers 12, 12' up and down. When the closers 12, 12' are lowered, the chain clips 10, 10' are set in clip positions. Reference numeral 33 denotes an uncloser (opener).

Take-up rolls 7, 7' are bilaterally provided to facilitate the threading of the film 1. The take-up rolls 7, 7' also support the middle of the film 1 to avoid interference with the clips. Rotary cutters 8, 8' cut only both sides of the film 1. The cutters 8, 8' cut the film 1 by bringing cutter members of two rotating cutter rolls into engagement with each other. Gears are secured to cutter shafts and mesh with each other, whereby the cutter rolls of the cutters 8, 8' rotate reversely to each other. The rotary cutters 8, 8' are driven by a motor M5 provided with a speed reducer. Scrap take-up unit 9 is provided on the downstream side of the rotary cutters and is driven by a motor M6 provided with a speed reducer. The scrap take-up unit 9 temporarily winds up the film 1 in a step preliminary to the film threading. This take-up unit 9 transfers the film 1 to the chain clips 10, 10' while feeding the film 1.

The symbol PS1 represents a side cut confirming photoelectric switch and PS2 a photoelectric switch for detecting the existence of an obliquely cut portion of the side of the film 1. The switch PS2 permits a start of the closer operation. Installed on the fixing side of the crosswise stretching device are the take-up rolls 7, 7', the rotary cutters 8, 8', the scrap take-up unit 9 and photoelectric switches PS1, PS2. Electromagnetic valves 24 and 25 act to change over the feed of compression air for raising and lowering the cutters 2 through 5. An electromagnetic valve 26 changes over the feed of compression air to the pneumatic cylinders 23, 23' for operating the clip closers 12, 12'. A pneumatic adjusting valve 27 adjusts the pressure of low pressure air fed to the film end detectors EPC1, EPC2. A control unit 30 calculates respective operation timings of the detectors EPC1, EPC2 and the chain clips 10, 10'. These calculations are effected upon receiving signals from individual sensors or based on a film speed at this time and previously inputted film pass data, i.e. positional data of the film end detectors EPC1, EPC2 and chain clips 10, 10'. The control unit 30 controls the motors and electromagnetic valves by supplying them with electric current.

Next, the operation of the present invention will be explained. The film fed from the longitudinal stretching unit runs above the cutters, 2, 3, 4 and 5 (with all of them lowered). The film 1 passes between the chain clips 10, 10' (with the clips expanded) via the feed roll 6 and the guide plates 71, 71'. The film 1 is bent upwards from the underside of the take-up rolls 7, 7'. The film 1 runs between the rotary cutters 8, 8' and is wound on the scrap take-up unit 9. The transferring of the film to the chain clips 10, 10' and receipt of the film 1 thereby starts from this state in which the film 1 is being smoothly normally fed.

Figure 7:
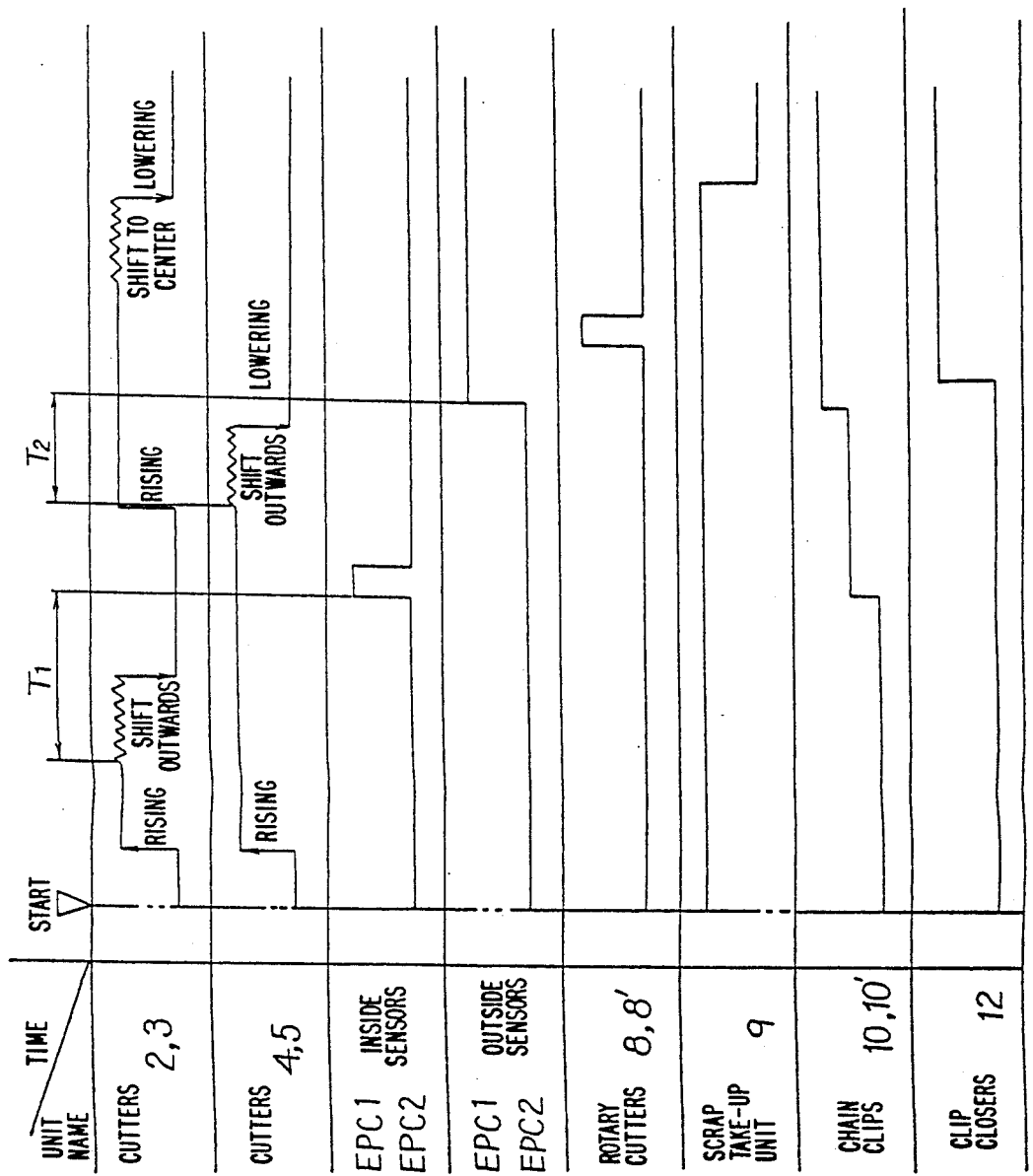
FIG. 7 is a time chart for the operation of the present invention.

FIGS. 3(a) to 3(f) show relationships between the travel of the film 1 and the operations of the cutters 2 through 5, the sensors, the rotary cutters 8, 8', the clip closers 12, 12' and the clip chains 10, 10'. The respective steps will be explained referring to FIGS. 3(a) through 3(f). FIG. 7 is an operating time chart.

(a) The cutters 2 to 5 move slightly away from both sides of the film 1 and rise in pairs parallel to the film travel direction, in which positions the cutters start cutting the film 1 longitudinally.

(b) After longitudinal cutting has been carried out for a little bit, the cutters 2 and 3 move sidewards to obliquely cut narrow side portions of the film. The cutters 4 and 5 remain at their positions and therefore cut out narrow films having free ends.

(c) The narrow films on both sides are ejected downwards (discharged by vacuum-pulling, if necessary) by the feed roll 6.

(d) The photoelectric switch EPC1 detects that the film has been cut away and transmits its signal to the control unit 30. Alternatively, a time ($T_1$) is calculated until the cut-away portion of the film has reached locations corresponding to the positions of inside sensors 60, 61 of the film end detectors EPC1, EPC2; then the inside sensors 60, 61 of the detectors EPC1, EPC2 are put into operation based on an instruction issued by the control unit. The film end detectors EPC1, EPC2 and the chain clips 10, 10' approach the film 1 and stop at positions at which the inside sensors sense the cut edges of the film. The inside sensors stop operating at this moment. The chain clips 10, 10' travel at the same velocity and in the same direction as the film 1. The cutters 4, 5 move sideward in response to the signal of the photoelectric switch PS1. The cutters 4, 5 start cutting the narrow films at an angle ($\theta$) oblique to the film feed direction. The cutters 2, 3 rise at a position inside of the cutters 4, 5 and start dividing the film 1 longitudinally into three parts.

The oblique cut angle ($\theta$) shown in FIG. 3 is an optimum angle which permits the chain clips to catch the film 1. The oblique cut angle is set by controlling a rotational speed of the motor M3 for moving the cutters 4, 5 in accordance with the film velocity. According to experimental data, the optimum angle is: $\Theta = 4° - 15°$.

(e) The photoelectric switch PS2 detects an oblique cutaway portion of the film 1. Alternatively, a time is calculated until the outermost side edges of the film will reach positions corresponding to the locations of outside sensors 62, 63 of the film end detectors EPC1, EPC2; then, the outside sensors 62, 63 of the detectors EPC1, EPC2 are put into operation in response to a signal from the control unit 30. Simultaneously, the chain clips 10, 10' further approach the film 1 and stop at film-seizing positions. Subsequently, the clip closers 12, 12' are lowered, while the chain clips 10, 10' start catching the film 1.

Figure 3A:
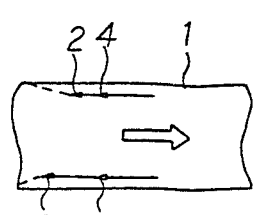
FIGS. 3(a) through 3(f) are schematic diagrams illustrating the operation of the present invention.
Figure 3B:
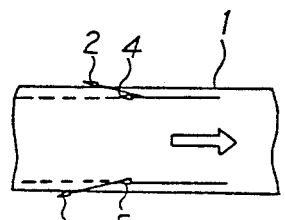
Figure 3C:
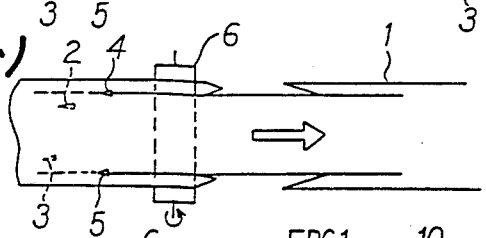
Figure 3D:
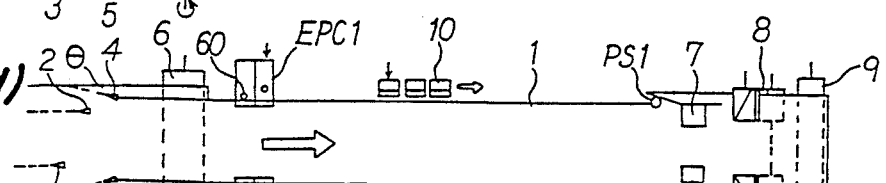
Figure 3E:
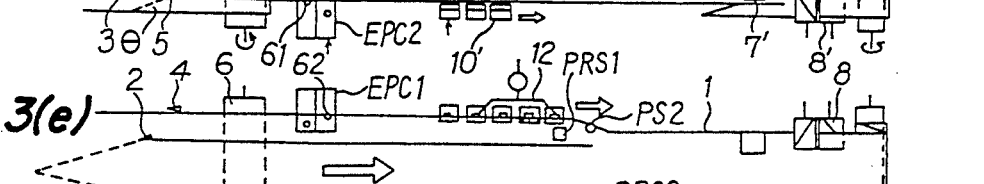

(f) Upon detecting that the film 1 has surely been caught by the chain clips 10, 10' through the clip confirming switches PRS1, PRS2, or when the operation shown in FIG. 3(e) comes to an end, the rotary cutters 8, 8' continue to rotate during a given period in response to signals from the control unit 30 thereof. Both side portions of the divided film 1 are cut by the rotary cutters 8, 8'. Concurrently, the cutters 2, 3 move close to the center of the film 1 and cut the middle part of the divided film 1. The cutters 2, 3 (4, 5) are then lowered. The film 1 is thus separated completely from the scrap take-up unit 9. The whole width thereof is pulled into the crosswise stretching device by the chain clips 10, 10'. Subsequent to this step, the scrap take-up unit 9 is stopped, thus finishing the transferring/receiving operation of the film.

Figure 3F:
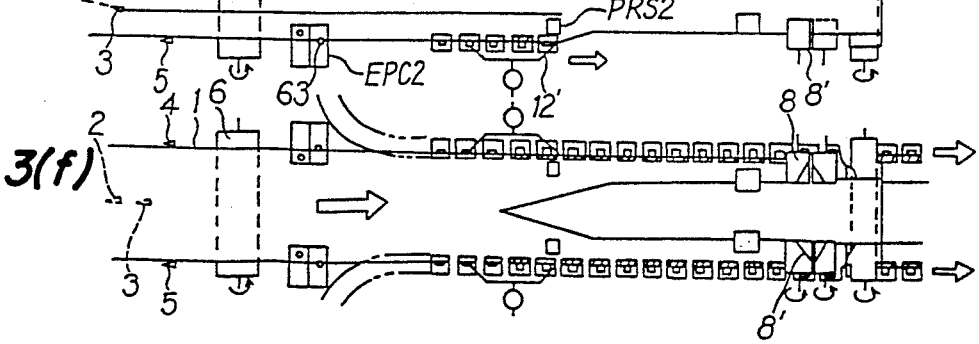

Note that in the operation shown in FIG. 3(f), if the chain clips 10, 10' fail to catch the film 1, such that both or either of the clip confirming switches PRS1 or PRS2 fails to emit a clip confirming signal, a timer beings counting from when the photoelectric switch PS2 is activated. If both of the switches PRS1 and PRS2 emit no signal within a predetermined period, the timer is turned off. The closers 12, 12' ascend, and the chain clips 10, 10' will not catch the film. The film end detectors EPC1, EPC2 and the chain clips 10, 10' shift outwards away from the film 1. The rotary cutters 8, 8', which originally function in response to the signals of the switches PRS1, PRS2, do not operate at all. The inward shifting of the cutters 2, 3 does not take place.

Figure 6:
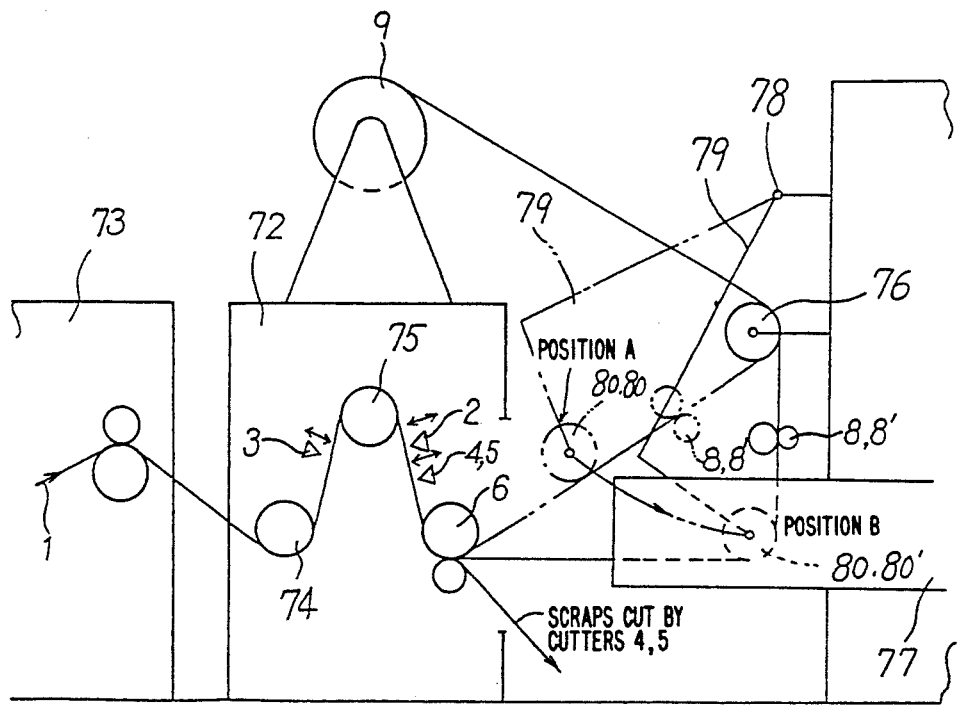
FIG. 6 is a side elevation view of another embodiment of an auto-threading apparatus of the present invention.

Then, the cutters 2 through 5 return to the positions depicted in FIG. 3(a), and the operation restarts again at the automatic transferring/receiving steps. If the film fails to be transferred or received during the previous operation, this film is wound directly on the scrap take-up unit 9. The film continues to be fed. FIG. 6 shows an embodiment of the present invention, which aims at threading the film to the scrap take-up unit 9 of the transferring/receiving mechanism as well as permitting the clips 10, 10' to catch the film after undergoing the threading process. The scrap take-up unit 9 is provided on an upper portion of a cutter unit 72. The take-up unit 9 is driven, as in the manner shown in FIG. 1, by a motor equipped with a speed reducer. There is provided an unillustrated threading chain for threading the film or a carrier rope of the longitudinal stretching device 73. The threading chain or carrier rope is continuously led to the scrap take-up unit 9 from rolls 74, 75 and a roll 6 of the cutter unit 72, constituting structure which is different from that of FIG. 1, via a guide roll 76 secured to the crosswise stretching device. The film 1 fed from the longitudinal stretching device 72 is threaded to and wound on the scrap take-up unit 9 by the threading chain or carrier rope through the rolls 74, 75, the roll 6 and the guide roll 76.

Based on the structure of the cutter unit 72, the bridge plate 31 provided on the upstream side of the feed roll in the embodiment of FIG. 1 is unnecessary. The cutters 2 through 5 are, as in the embodiment of FIG. 1, attached to the feed screws 15 through 17 which are rotatably supported on the side plates of the cutter unit 72. The cutters 2 through 5 are advanceable and retreatable in directions perpendicular to the surface of the film 1. The take-up rolls 7, 7' illustrated in FIG. 1 are fixed to a tenter frame 77. In FIG. 6, however, take-up rolls 80, 80' are fitted to an arm 79 swingable about a fulcrum 78 secured to the crosswise stretching device. The rolls 80, 80' are swingable between positions A and B with the aid of an unillustrated air cylinder. The roll cutters 8, 8' are rotatably supported on the arm 79 through an unillustrated bracket. The take-up rolls 80, 80' are raised up to the position A when threading the film 1 to the scrap take-up unit 9, whereby the threading of the film 1 is facilitated. The film 1 is wound on the scrap take-up unit 9. Thereafter, the take-up rolls 80, 80' are moved from the position A to the position B by an unillustrated air cylinder, whereby the film 1 can be caught by the clips 10, 10'. After finishing this operation, the auto-threading operations shown in FIG. 3(a) through 3(f) are begun. Note that the scrap take-up unit 9 can be set in the position illustrated in FIG. 1. Opening/closing type cutters may be used instead of the roll cutters 8, 8'.

Figure 8:
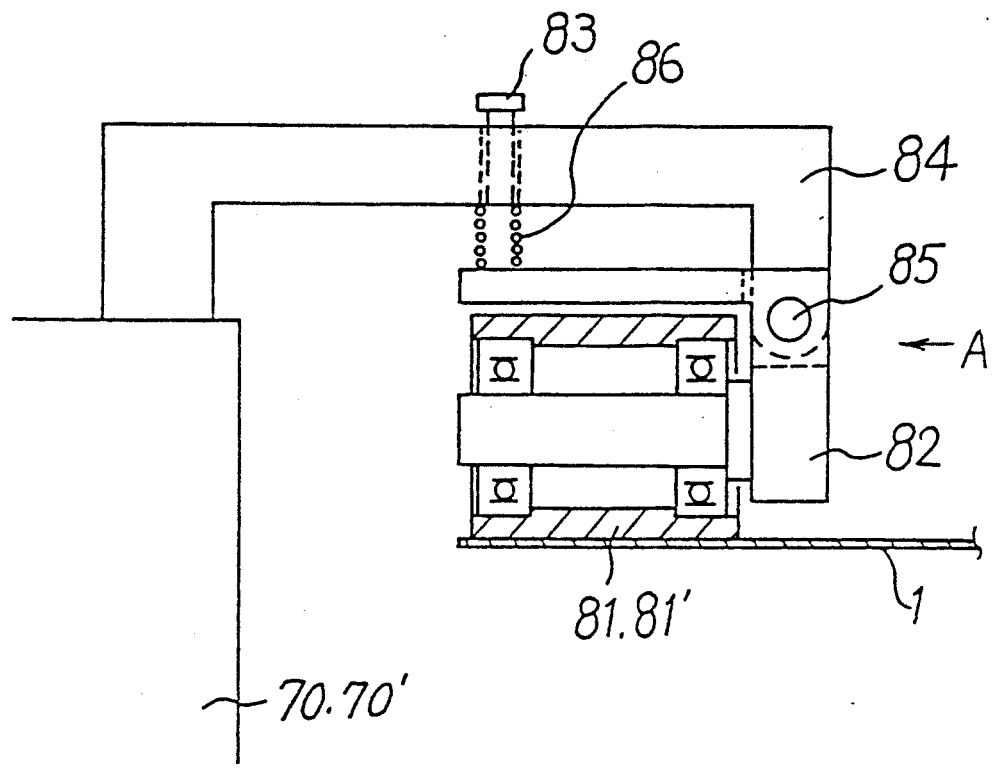
FIG. 8 is a sectional view of a winding roll of the present invention.
Figure 9:
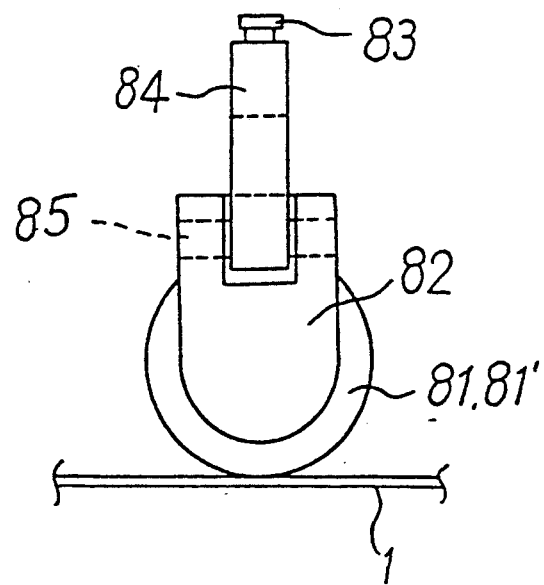
FIG. 9 is a side view of the same taken in the direction of arrow A of FIG. 8.

Note that rolls 81, 81' of FIGS. 8 and 9 can be adopted in place of the take-up rolls 7, 7' of FIG. 1. The rolls 81, 81' are rotatably supported on an L-shaped bracket 82 provided with a bar 83. A support body 84 is fixed to a frame 70'. The support body 84 rotatably supports the L-shaped bracket 82 with a pin 85. The support body 84 is constantly biased downwards by a compression spring 86. Hence, the take-up rolls 81, 81' tension the sides of the film 1 in directions orthogonal to the feeding direction thereof.

Although the embodiments of this present invention have been described in detail with reference to the accompanying drawings, it is to be understood that the present invention is not limited to these embodiments. Various changes or modifications may be effected therein by one skilled in the art without departing from the scope or spirit of the invention.

What is claimed is:

1. An auto-threading apparatus of a film processing line, said apparatus comprising:
    take-up unit means for taking up a film;
    two pairs of first cutters disposed upstream of said take-up unit means with respect to the direction in which said take-up unit means takes up film in the apparatus, each of said cutters having a cutter blade and a support supporting said cutter blade so as to be freely rotatable;
    means for moving said cutter blades vertically and transversely in the apparatus;
    chain clips disposed between said cutters and said take-up unit means, said chain clips being located across from one another in the transverse direction of the apparatus, and said chain clips comprising grippers;
    chain means for driving said chain clips in a longitudinal direction of the apparatus;
    second cutters disposed downstream of the chain clips in the apparatus and across from one another in the transverse direction of the apparatus; and
    control unit means for controlling the respective operations of said means for moving said cutter blades, said chain clips, and said second cutters.

2. An auto-threading apparatus of a film processing line as claimed in claim 1, and further comprising guide rolls disposed upstream of the cutters disposed downstream of the chain clips in the apparatus, and take-up rolls swingable across a film feed path defined between said guide rolls and said take-up unit means, whereby the direction in which film travels downstream of said guide rolls is changeable by said take-up rolls.

3. An auto-threading apparatus of a film processing line as claimed in claim 2, and further comprising film guide plates disposed upstream of said chain clips in the apparatus so as to guide film to the chain clips.

4. An auto-threading apparatus of a film processing line as claimed in claim 3, and further comprising drive means for shifting said chain clips toward and away from the film feed path in the apparatus and wherein said control unit means determines a timing by which said drive means shifts said chain clips toward the film feed path on the basis of a velocity at which a film is fed in the apparatus and on film pass data, said control unit means also being operatively connected to said drive means for controlling said drive means to shift said chain clips toward the film feed path under said timing.

5. An auto-threading apparatus of a film processing line as claimed in claim 4, and further comprising winding rolls disposed upstream of said take-up unit means in the apparatus and located across from one another in the transverse direction of the apparatus, and spring means for biasing said winding rolls toward a path along which film is fed to said take-up unit means.

6. An auto-threading apparatus of a film processing line as claimed in claim 3, and further comprising winding rolls disposed upstream of said take-up unit means in the apparatus and located across from one another in the transverse direction of the apparatus, and spring means for biasing said winding rolls toward a path along which film is fed to said take-up unit means.

7. An auto-threading apparatus of a film processing line as claimed in claim 2, and further comprising drive means for shifting said chain clips toward and away from the film feed path in the apparatus, and wherein said control unit means determines a timing by which said drive means shifts said chain clips toward the film feed path on the basis of a velocity at which a film is fed in the apparatus and on film pass data, said control unit means also being operatively connected to said drive means for controlling said drive means to shift said chain clips toward the film feed path under said timing.

8. An auto-threading apparatus of a film processing line as claimed in claim 7, and further comprising winding rolls disposed upstream of said take-up unit means in the apparatus and located across from one another in the transverse direction of the apparatus, and spring means for biasing said winding rolls toward a path along which film is fed to said take-up unit means.

9. An auto-threading apparatus of a film processing line as claimed in claim 2, and further comprising winding rolls disposed upstream of said take-up unit means in the apparatus and located across from one another in the transverse direction of the apparatus, and spring means for biasing said winding rolls toward a path along which film is fed to said take-up unit means.

10. An auto-threading apparatus of a film processing line as claimed in claim 1, and further comprising film guide plates disposed upstream of said chain clips in the apparatus so as to guide film to the chain clips.

11. An auto-threading apparatus of a film processing line as claimed in claim 10, and further comprising drive means for shifting said chain clips toward and away from a film feed path in the apparatus, and wherein said control unit means determines a timing by which said drive means shifts said chain clips toward the film feed path on the basis of a velocity at which a film is fed in the apparatus and on film pas data, said control unit means also being operatively connected to said drive means for controlling said drive means to shift said chain clips toward the film feed path under said timing.

12. An auto-threading apparatus of a film processing line as claimed in claim 11, and further comprising winding rolls disposed upstream of said take-up unit means in the apparatus and located across from one another in the transverse direction of the apparatus, and spring means for biasing said winding rolls toward a path along which film is fed to said take-up unit means.

13. An auto-threading apparatus of a film processing line as claimed in claim 10, and further comprising winding rolls disposed upstream of said take-up unit means in the apparatus and located across from one another in the transverse direction of the apparatus, and spring means for biasing said winding rolls toward a path along which claim is fed to said take-up unit means.

14. An auto-threading apparatus of a film processing line as claimed in claim 1, and further comprising drive means for shifting said chain clips toward and away from a film feed path in the apparatus, and wherein said control unit means determines a timing by which said drive means shifts said chain clips toward the film feed path on the basis of a velocity at which a film is fed in the apparatus and on film pass data, said control unit means also being operatively connected to said drive means for controlling said drive mans to shift said chain clips toward the film feed path under said timing.

15. An auto-threading apparatus of a film processing line as claimed in claim 14, and further comprising winding rolls disposed upstream of said take-up unit means in the apparatus and located across from one another in the transverse direction of the apparatus, and spring means for biasing said winding rolls toward a path along which film is fed to said take-up unit means.

16. An auto-threading apparatus of a film processing line as claimed in claim 1, and further comprising winding rolls disposed upstream of said take-up unit means in the apparatus and located across from ne another in the transverse direction of the apparatus, and spring means for biasing said winding rolls toward a path along which film is fed to said take up unit means.

* * * * *